May 25, 1965 W. R. BRENEMAN 3,184,773
DOCK PLATE
Filed Sept. 7, 1961
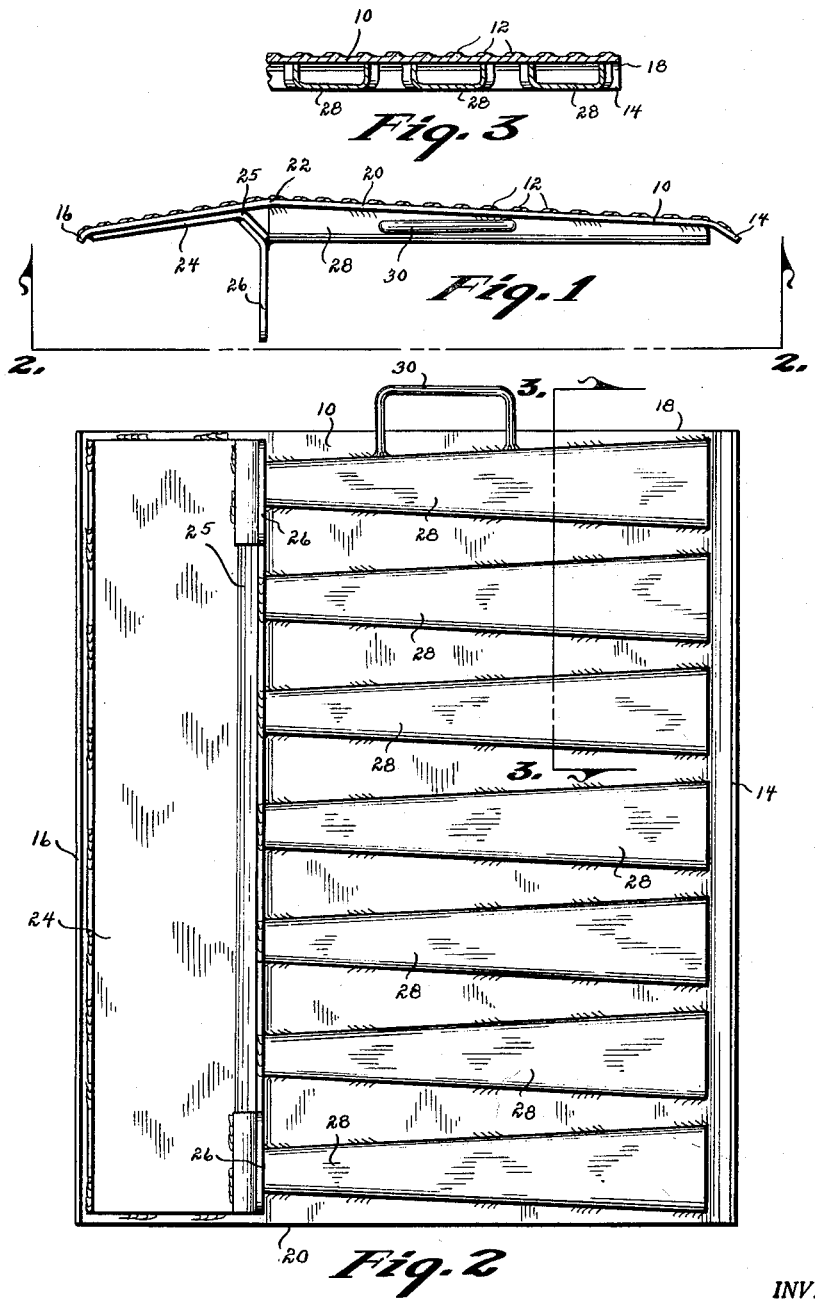
INVENTOR.
WARREN R. BRENEMAN
BY Talbert, Dick & Farley
ATTORNEYS
WITNESS
NORMAN G. TRAVISS

United States Patent Office 3,184,773
Patented May 25, 1965

3,184,773
DOCK PLATE
Warren R. Breneman, West Des Moines, Iowa, assignor to Woodford Manufacturing Company, Des Moines, Iowa, a corporation of Iowa
Filed Sept. 7, 1961, Ser. No. 136,658
7 Claims. (Cl. 14—72)

This invention relates to dock plates and more specifically to relatively lightweight dock plates adapted to be employed in the loading and unloading of items and materials by hand trucks, powered equipment and the like.

Heretofore, loading dock plates of this type have generally been composed of nothing more than an ordinary flat metal sheet detachably extending between two spaced supporting surfaces such as a truck bed and a dock. There are several drawbacks to such a construction and the first one which usually presents itself is that the dock plate will dangerously slip out of position at the moment a load is moved thereonto. Another drawback to dock plates of this type is that they dangerously bend and buckle when a heavy load is moved thereonto. Still another drawback is that dock plates of this type are undesirably and uneconomically heavy. Still another drawback thereto is that the inherent design thereof permits employment with substantially no height differential between the article contacting ends thereof.

Therefore, one of the principal objects of my invention is to provide a dock plate for hand trucks and the like which will stay in place during loading and unloading operations.

Another object of this invention is to provide a dock plate that will resist bending and buckling even under the heaviest loads.

Still another object of this invention is to provide a dock plate of the above stated type which is relatively light in weight in relation to its size and stress potential.

Still another object of this invention is to provide a dock plate that permits both ends to lie flat when used a various height differential therebetween.

Still another object of this invention is to provide a metal sheet dock plate of the above stated type which has a permanent non-skid top surface.

And still other objects of my invention are to provide a dock plate which is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawing, in which:

FIG. 1 is a side view of my dock plate ready for use.

FIG. 2 is an enlarged bottom view of the dock plate taken from line 2—2 of FIG. 1.

FIG. 3 is a cross-sectional view of my dock plate taken on line 3—3 of FIG. 2 and more fully illustrates its construction.

In the drawings, the numeral 10 generally designates the floor or base portion sheet of my loading dock plate. A plurality of treads 12 cover and extend from the top surface of the sheet floor 10. The sheet floor 10 is substantially rectangular in surface area and is terminated by the two ends 14 and 16, and the two sides 18 and 20.

The edges of the ends 14 and 16 may be angled slightly downwardly and outwardly as shown in FIG. 1 so as to adapt the edges to permit positive contact with the surfaces they are to lie against in normal operation. This procedure greatly facilitates the moving of various types of loads onto and off of the base portion or floor 10.

As shown in FIG. 1, the base portion 10 has a downward bend disposed therein at 22 which is in spaced parallel relation to the ends 14 and 16 and is closer to the end 16 than it is to the end 14. This bend, or angle at 22, in the base portion 10 not only strengthens the dock plate but permits the dock plate to be utilized with the edges of both of the ends 14 and 16 flat against and in total length contact with the surfaces against which they abut in operation even when these surfaces are at various differentials of height in relation to each other. Naturally, with this arrangement, the dock plate has a much greater scope of utilization than it otherwise would have.

Disposed on the underside of the base member 10 and occupying the area from the end 16 to near the angle 22 in the base member 10 is the plate member 24 which adds structural strength and support to that portion of the base member 10 under which it is disposed. This plate member 24 is angled at 25 downwardly and inwardly and away from the bottom surface of the base member 10 as shown in FIG. 2. The angle at 25 is greater than the angle at 22 of the base 10 and is in spaced parallel relation thereto.

Disposed on the portion of the plate member 24 which is angled away from the bottom surface of the base member 10 are the abutment plates 26, as shown in FIGS. 1 and 2. These abutment plates 26 are spaced apart from each other, are bent to extend directly downwardly and are adapted to abut against the edge of the dock or truck over which the end 16 lies and the purpose is to keep the dock plate in its proper longitudinal position while loads are moved thereacross from the end 14 to the end 16 thereof. If the loads are moved in the opposite direction, the dock plate is merely reversed.

Disposed in the bottom surface of the base platform member 10 and occupying the area thereof from the plate member 24 to the end 14 are the structural supports 28. The structural supports 28 may be of any suitable type which perfects the cross-sectional structural triangulation of the dock plate, but in the preferred embodiment of the invention they consist of a plurality of spaced apart U-shaped elongated members. These structural supports 28 are rigidly secured at one end to downwardly angled portion of the plate member 24 and at this location are relatively narrow and deep in cross-section. The structural support members 28 extend longitudinally of the platform base and toward the end 14. They progressively become shallower and preferably wider as they approach and terminate immediately previous to the downwardly and outwardly angled edge of the end 14, as shown in FIGS. 1 and 2. The structural supports 28 are also rigidly secured to the bottom surface of the base member 10. If desired, all the members 28 may be stamped as a unit from a sheet. The combination of the structural supporting plate member 24 and the structural supports 28 creates a lightweight perfection of the cross-sectional triangulation of the dock plate structure, thus providing a very high stress factor in relation to the light weight of the dock plate. In this manner durability in operation and economy in manufacture are achieved.

Disposed on at least one of the sides 18 and 20 of the base member 10 is the hand grip means 30. The hand grip means 30 may take any suitable form, but it is suggested that it be rigidly secured onto the base member 10, lie in a plane substantially parallel thereto and also be in close spaced parallel relation to the preferred end as shown in FIG. 2.

The base platform 10, sheet plate member 24, sheet abutment plate lugs 26, and sheet structural support members are secured together in the arrangement thus described, by any suitable means such as solder, welding, spot welding, rivets or like. Preferably the various pieces that go to make up the unit are formed from sheet material. Usually the sheet material will be a suitable metal.

Some changes may be made in the construction and arrangement of my dock plate without departing from the real spirit and purpose of my invention, and it is my intention to cover by my claims, any modified forms of structure or use of mechanical equivalents which may be reasonably included within their scope.

I claim:

1. In a dock plate, comprising, an elongated base member having a top and bottom surface, a downwardly angled bend in said base member along a bend line disposed in spaced relation to the ends of said base member and defining a plate section on opposite sides of said bend line, each of said sections being flat throughout their substantial length, one of said sections having reinforcing means, a plurality of transversely spaced apart longitudinally extending elongated channel-shaped members having side walls with their outer longitudinal edges fixedly secured to the bottom surface of said other section, said channel members each having one end terminating adjacent said bend line in said base member, said elongated members extending in substantially parallel relation to adjacent the end of said base member opposite said one section, said elongated members having a width uniformly increasing along its length beginning with said one end, and said elongated members uniformly decreasing in thickness along its length measured along a vertical plane beginning with said one end.

2. In a dock plate, comprising, an elongated base member having a top and bottom surface, a downwardly angled bend in said base member along a bend line disposed in spaced relation to the ends of said base member and defining a plate section on opposite sides of said bend line, each of said sections being flat throughout their substantial length, a plate member fixedly secured in mating parallel relationship to the under side of one of said plate sections and being substantially coextensive with the area of said one plate section, said plate member having an inner end extending downwardly and rearwardly and terminating adjacent a vertical plane passing transversely vertically through said bend line lengthwise thereof, a plurality of transversely spaced apart longitudinally extending elongated channel-shaped members having side walls with their outer longitudinal edges fixedly secured to the bottom surface of said other section, said channel members in abutting engagement at one end with said downwardly and rearwardly extending inner end of said plate member, said elongated members extending in substantially parallel relation to adjacent the end of said base member opposite said plate member, said elongated members having a width uniformly increasing along its length beginning with said one end, and said elongated members uniformly decreasing in thickness along its length measured along a vertical plane beginning with said one end.

3. The structure of claim 2 wherein said one section of said base member is shorter than the other section of said base member.

4. In a dock plate, comprising, an elongated base member having a top and bottom surface, a downwardly angled bend in said base member along a bend line disposed in spaced relation to the ends of said base member and defining a plate section on opposite sides of said bend line, each of said sections being flat throughout their substantial length, a plate member fixedly secured in mating parallel relationship to the under side of one of said plate sections and being subtsantially coextensive with the area of said one plate section, said plate member having an inner end extending downwardly and rearwardly and terminating adjacent a vertical plane passing transversely vertically through said bend line lengthwise thereof, a plurality of transversely spaced apart longitudinally extending elongated channel-shaped members having side walls with their outer longitudinal edges fixedly secured to the bottom surface of said other section, said channel members in abutting engagement at one end with said downwardly and rearwardly extending inner end of said plate member, said elongated members extending in substantially parallel relation to adjacent the end of said base member opposite said plate member, said elongated members having a width uniformly increasing along its length beginning with said one end, and said elongated members uniformly decreasing in thickness along its length measured along a vertical plane beginning with said one end, said width and thickness of each elongated member being such that said elongated member has substantially the same strength property at all points along its length.

5. In a dock plate, comprising, an elongated base member having a top and bottom surface, a downwardly angled bend in said base member along a bend line disposed in spaced relation to the ends of said base member and defining a plate section on opposite sides of said bend line, each of said sections being flat throughout their substantial length, a plate member fixedly secured in mating parallel relationship to the under side of one of said plate sections and being substantially coextensive with the area of said one plate section, said plate member having an inner end extending downwardly and rearwardly and terminating adjacent a vertical plane passing transversely vertically through said bend line lengthwise thereof, a plurality of transversely spaced apart longitudinally extending elongated channel-shaped members having side walls with their outer longitudinal edges fixedly secured to the bottom surface of said other section, said channel members in abutting engagement at one end with said downwardly and rearwardly extending inner end of said plate member, said elongated members extending in substantially parallel relation to adjacent the end of said base member opposite said plate member, said elongated members having a width uniformly increasing along its length beginning with said one end, and said elongated members uniformly decreasing in thickness along its length measured along a vertical plane beginning with said one end, said thickness of said elongated members varying sufficiently along their length to present flat bottom sides lying in a common plane.

6. In a dock plate, comprising, an elongated base member having a top and bottom surface, a downwardly angled bend in said base member along a bend line disposed in spaced relation to the ends of said base member and defining a plate section on opposite sides of said bend line, each of said sections being flat throughout their substantial length, a plate member fixedly secured in mating parallel relationship to the under side of one of said plate sections and being substantially coextensive with the area of said one plate section, said plate member having an inner end extending downwardly and rearwardly and terminating adjacent a vertical plane passing transversely vertically through said bend line lengthwise thereof, a plurality of transversely spaced apart longitudinally extending elongated channel-shaped members having side walls with their outer longitudinal edges fixedly secured to the bottom surface of said other section, said channel members in abutting engagement at one end with said downwardly and rearwardly extending inner end of said plate member, said elongated members extending in substantially parallel relation to adjacent the end of said base member opposite said plate member, said elongated members having a width uniformly increasing along its length beginning with said one end, and said elongated members uniformly decreasing in thickness along its length measured along a vertical plane beginning with said one end, said width and thickness of each elongated member being such that said elongated member has substantially the same strength property at all points along its length, said thickness of said elongated members varying sufficiently along their length to present flat bottom sides lying in a common plane.

7. The structure of claim 6 and at least two plate elements being secured in spaced relationship to the bottom side of said plate member and extending vertically downwardly in substantially the vertical plane extending through said bend line lengthwise thereof, and said plate elements terminating at points substantially below the plane of the flat bottom sides of said elongated channel members.

References Cited by the Examiner

UNITED STATES PATENTS

| | | | |
|---|---|---|---|
| 1,821,734 | 9/31 | Viche | 14—72 |
| 2,284,022 | 5/42 | Schmeller | 14—72 |
| 2,521,349 | 9/50 | Diamond | 14—72 |
| 2,629,120 | 2/53 | Nelson | 14—72 |
| 2,666,936 | 1/54 | Palmer | 14—72 |

JACOB L. NACKENOFF, *Primary Examiner.*

WILLIAM I. MUSHAKE, *Examiner.*